US007827557B2

(12) United States Patent
Zhu et al.

(10) Patent No.: US 7,827,557 B2
(45) Date of Patent: *Nov. 2, 2010

(54) METHOD AND APPARATUS FOR ALLOCATING RESOURCES TO APPLICATIONS USING A LINEARIZED OBJECTIVE FUNCTION

(75) Inventors: Xiaoyun Zhu, San Jose, CA (US); Ciprianos Santos, Modesto, CA (US); Julie Ward Drew, Redwood City, CA (US); Dirk Beyer, Walnut Creek, CA (US); Sharad Singhal, Belmont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1543 days.

This patent is subject to a terminal disclaimer.

(21) Appl. No.: 10/808,073

(22) Filed: Mar. 24, 2004

(65) Prior Publication Data

US 2005/0228850 A1 Oct. 13, 2005

(51) Int. Cl.
*G06F 9/46* (2006.01)
*G06F 15/173* (2006.01)
*G06F 11/00* (2006.01)

(52) U.S. Cl. .................. 718/104; 718/105; 709/224; 709/226; 370/238

(58) Field of Classification Search ............ 718/104, 718/105; 709/217, 219, 224, 226; 370/238
See application file for complete search history.

(56) References Cited

U.S. PATENT DOCUMENTS

| 5,956,489 | A | | 9/1999 | San Andres et al. |
|---|---|---|---|---|
| 6,069,894 | A | * | 5/2000 | Holender et al. ............ 370/397 |
| 6,272,483 | B1 | * | 8/2001 | Joslin et al. .................. 706/62 |
| 6,321,317 | B1 | * | 11/2001 | Borowsky et al. ............ 711/170 |
| 6,574,669 | B1 | * | 6/2003 | Weaver ....................... 709/239 |
| 6,625,643 | B1 | | 9/2003 | Colby et al. |
| 7,146,353 | B2 | * | 12/2006 | Garg et al. ...................... 707/2 |
| 7,443,799 | B2 | * | 10/2008 | Varanasi et al. .............. 370/238 |
| 2002/0065864 | A1 | | 5/2002 | Hartsell et al. |
| 2002/0120744 | A1 | | 8/2002 | Chellis et al. |
| 2002/0194251 | A1 | | 12/2002 | Richter et al. |
| 2003/0028642 | A1 | * | 2/2003 | Agarwal et al. .............. 709/226 |
| 2003/0046396 | A1 | | 3/2003 | Richter et al. |
| 2003/0120780 | A1 | * | 6/2003 | Zhu et al. .................... 709/226 |
| 2003/0126260 | A1 | * | 7/2003 | Husain et al. ................ 709/225 |
| 2004/0117476 | A1 | | 6/2004 | Steele et al. |
| 2004/0153376 | A1 | | 8/2004 | Ganesan et al. |

(Continued)

OTHER PUBLICATIONS

Kodialam et al. "Minimum interference routing with applications to MPLS traffic engeering", Proceedings of IEEE Infocom, 2000.*

(Continued)

*Primary Examiner*—Kenneth Tang (57) ABSTRACT

A method, system, and apparatus is disclosed for allocating resources to applications. Available resources of a networked computing system may be determined. For each application, required resources of the application may be determined. An assigned subset of the available resources for each application is determined as a function of the required resources of the application and the available resources. The function reduces communication delays between resources of the subset of the available resources in conformance with bandwidth capacity requirements of the application and in conformance with network bandwidth limitations. The applications may then be associated with the assigned subsets of resources.

27 Claims, 4 Drawing Sheets

U.S. PATENT DOCUMENTS

| | | | |
|---|---|---|---|
| 2004/0177245 A1 | 9/2004 | Murphy et al. | |
| 2004/0267897 A1* | 12/2004 | Hill et al. | 709/217 |
| 2005/0021530 A1* | 1/2005 | Garg et al. | 707/100 |
| 2005/0172291 A1* | 8/2005 | Das et al. | 718/104 |
| 2005/0228850 A1 | 10/2005 | Zhu et al. | |

OTHER PUBLICATIONS

Lee et al., "Explicit routing with QoS constraints in IP over WDM", Apr. 2002, IEE Proc. Commun., vol. 149, No. 2, pp. 83-91.*

Lee et al. "Routing Subject to Quality of Service Constraints in Integrated Communication Networks", Jul./Aug. 1995, IEEE Network, pp. 46-55.*

J. Rolia, X. Zhu and M. Arlitt, "Resource access management for a utility hosting enterprise applications," in Proceedings of the 8th IFIP/IEEE Symposium on Integrated Network Managemnet (IM), Mar. 2003.

X. Zhu and S. Singhal, "Optimal resource assignment in Internet data centers," Proceedings of the 9th International Symposium on Modeling, Analysis, and Simulation of Computer and Telecommunications Systems (Mascots), pp. 61-69, Aug. 2001.

U.S. Appl. No. 10/808,073, Office Action dated Apr. 3, 2009, pp. 1-29 with attachments.

U.S. Appl. No. 10/624,318, Office Action dated Mar. 9, 2006, pp. 1-12 with attachments.

Ward, J. et al., Appia: Automatic Storage Area Network Fabric Design, Jan. 28-30, 2002 (15 pages).

* cited by examiner

METHOD AND APPARATUS FOR ALLOCATING RESOURCES TO APPLICATIONS USING A LINEARIZED OBJECTIVE FUNCTION

FIELD OF THE INVENTION

The present disclosure relates to allocating resources to applications.

BACKGROUND

Utility computing is viewed by many as the model of computing for the future, although the vision has been around for decades. The MULTICS project in the 1960s had the goal of developing "a new computer system specifically organized as a prototype of a computer utility," with one of its requirements being "continuous operation analogous to that of the electric power and telephone companies." In a computing utility, computing resources and capabilities are provided to people and businesses as a service.

One example of a computing utility that exists today is the Grid, which offers spare compute cycles to scientific and engineering applications. Another example is data center, where a large pool of IT resources are centrally managed to meet the needs of business critical enterprise applications such as enterprise resource planning applications, database applications, customer relationship management applications, and general e-commerce applications. There has been a wave of industrial initiatives to provide infrastructure and management support for such utilities.

A large utility computing environment can contain thousands of servers and storage devices connected through a shared high speed network fabric. The goal is to offer "infrastructure on demand," which means compute, networking, and storage resources are provided to applications as they need them. Most of the resources will be virtualized and shared across multiple applications to achieve economies of scale and increase return on investment. The complexity of managing such an infrastructure and applications simultaneously is enormous. Automation is needed to lower operation cost and reduce human error. Well-informed capacity planning and resource provisioning are required to increase asset utilization and meet service level objectives.

SUMMARY

A method, system, and apparatus is disclosed for allocating resources to applications. Available resources of a networked computing system are determined. For each application, required resources of the application are determined. An assigned subset of the available resources for each application is determined as a function of the required resources of the application and the available resources. The function reduces communication delays between resources of the subset of the available resources in conformance with bandwidth capacity requirements of the application and in conformance with network bandwidth limitations. The applications may then be associated with the assigned subsets of resources.

DETAILED DESCRIPTION

In the following description of various embodiments, reference is made to the accompanying drawings which form a part hereof, and in which is shown by way of illustration various example manners by which the invention may be practiced. It is to be understood that other embodiments may be utilized, as structural and operational changes may be made without departing from the scope of the present invention.

Figure 1:
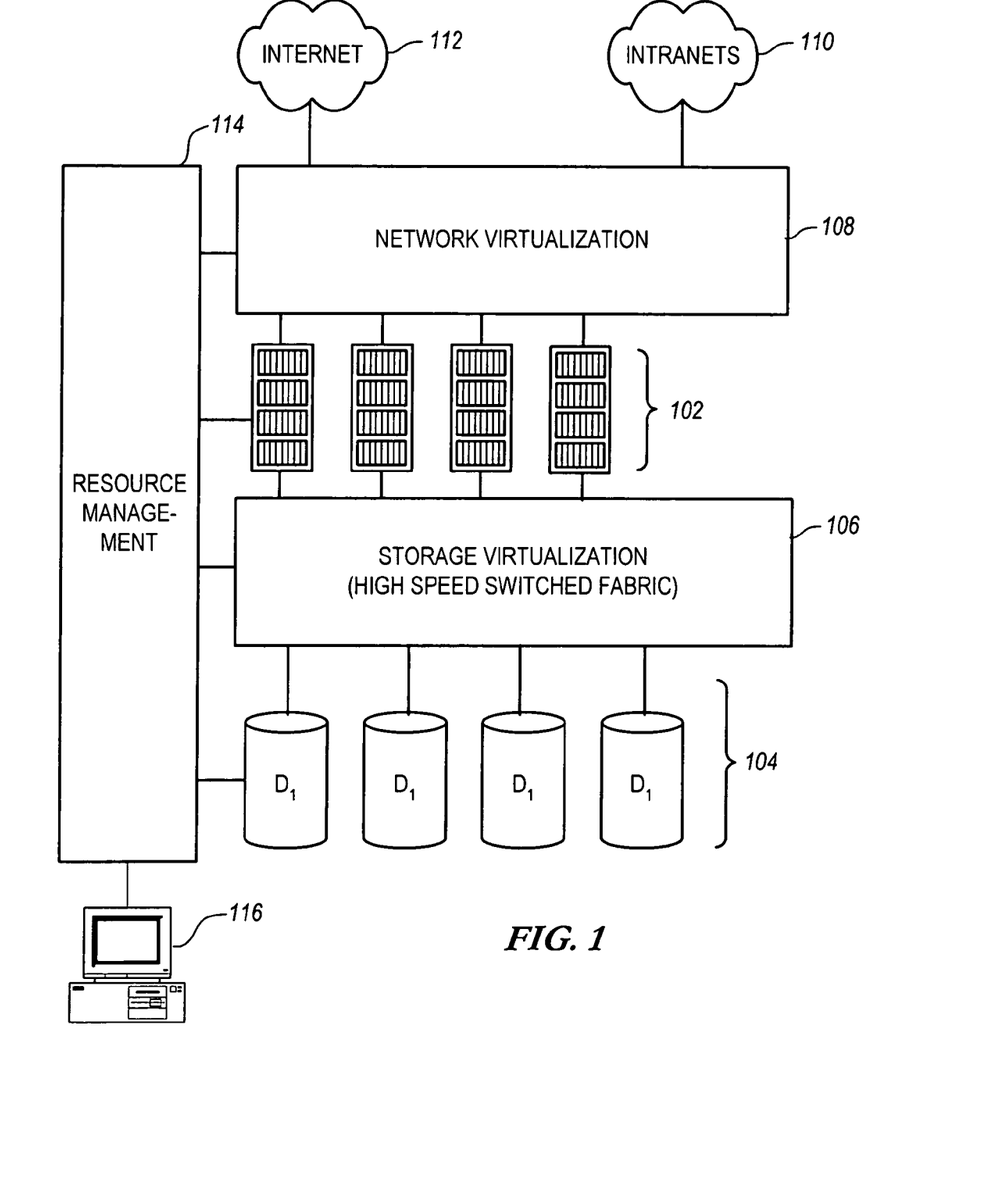
FIG. 1 is a diagram of a utility computing infrastructure according to embodiments of the invention.

In general, the present disclosure relates to a resource assignment problem (RAP) for a large-scale computing utility, such as an Internet data center. FIG. 1 shows a computing utility infrastructure diagram 100 according to embodiments of the present invention. The infrastructure 100 includes servers 102 and storage devices 104 connected through a shared storage area network (SAN) 106. The storage devices may be "virtualized," meaning that it may appear to the servers 102 and other network entities as if the storage devices 104 are locally connected and controlled. The storage devices 104 are actually remotely connected via the network fabric 106, and the physical components (e.g., disk arrays) of the storage devices 104 may be shared among many servers 102 at once.

The servers 102 may also be accessed via a network 108. The computing resources of the servers 102 may be virtualized over the high speed network fabric 108, such that the computing resources (e.g., processing, memory, storage) of each server 102 may be simultaneously shared by numerous applications and users. The applications may access the computing resources internally (e.g., via an intranet 110) or externally (e.g., via the Internet 112).

The goal of the utility computing infrastructure 100 is to offer "infrastructure on demand," which means that computing, networking, and storage resources are provided to applications as they need them. Most of the resources will be virtualized and shared across multiple applications to achieve economies of scale and increase return on investment.

A large-scale utility computing infrastructure 100 may contain thousands of servers 102 and storage devices 104. The complexity of managing such an infrastructure and applications simultaneously is enormous. Automation is needed to lower operation cost and reduce human error. Well-informed capacity planning and resource provisioning are required to increase asset utilization and meet service level objectives.

When an application is deployed in a computing utility infrastructure 100, it is allocated a partition of resources in a virtual application environment to meet the specific needs of the application. As each application's real time workload varies over time, resources can be dynamically re-allocated and re-distributed among all running applications to achieve high resource utilization. In most cases, the physical identities of the allocated resources are transparent to the application due to virtualization of resources.

It is the utility provider's job to choose the right set of physical resources for each application and its components to satisfy the application's configuration and performance requirements, to avoid resource bottlenecks in the infrastructure, to achieve certain goals or enforce certain policies. This decision-making process is referred to as "resource assignment." Techniques for dealing with this process are an integral part of a resource access management framework that controls the complete lifecycle of applications' access to resources in a computing utility.

In today's data centers, resource assignment is typically done by human operators, which is slow, expensive, and error prone. As the size of future computing utilities grows to the magnitude of tens of thousands of resources, the number of possibilities to provision a given application goes far beyond the tracking ability of any human. This calls for a more systematic approach for resource assignment so that it can be automated to significantly shorten application deployment cycles and minimize operator overhead.

It will be appreciated that in the example infrastructure 100 a resource management application 114 may be used to automatically assign resources. The resource management application 114 may be used for initial resource assignments, as well as dynamically re-allocating resources in operation. The resource management application 114 may run on one or more data processing arrangements, such as a computer 116, which includes computer-readable medium configured with instructions, wherein the computer-readable medium can be a memory or disk-based storage.

In general, a naïve scheme or resource assignment such as random selection or first-come-first-served may not work because there are too many consequences to any particular solution that is chosen. For instance, the compute requirements of the application may not be met by some of the servers, the latency of the application can be poor, or the cost involved may be too high, etc. In particular, since networking resources are shared among different applications and their components, it is highly likely for a network link to become a bottleneck thus degrading the performance of the applications that share this link. This assumes that network resources are not over-provisioned, and relatively high utilization on these resources is desired. Therefore, resource assignment is a highly complex problem that requires more intelligent solution techniques.

Every application to be deployed in a computing utility has high-level requirements such as number of concurrent users, number of transactions per second and infrastructure cost. Usually the mapping between these requirements and the specific identities of the resources that are used to host the application is not straightforward. This mapping may be broken down into two steps, 1) determining resource requirements, and 2) mapping those requirements to available resources.

Figure 2:
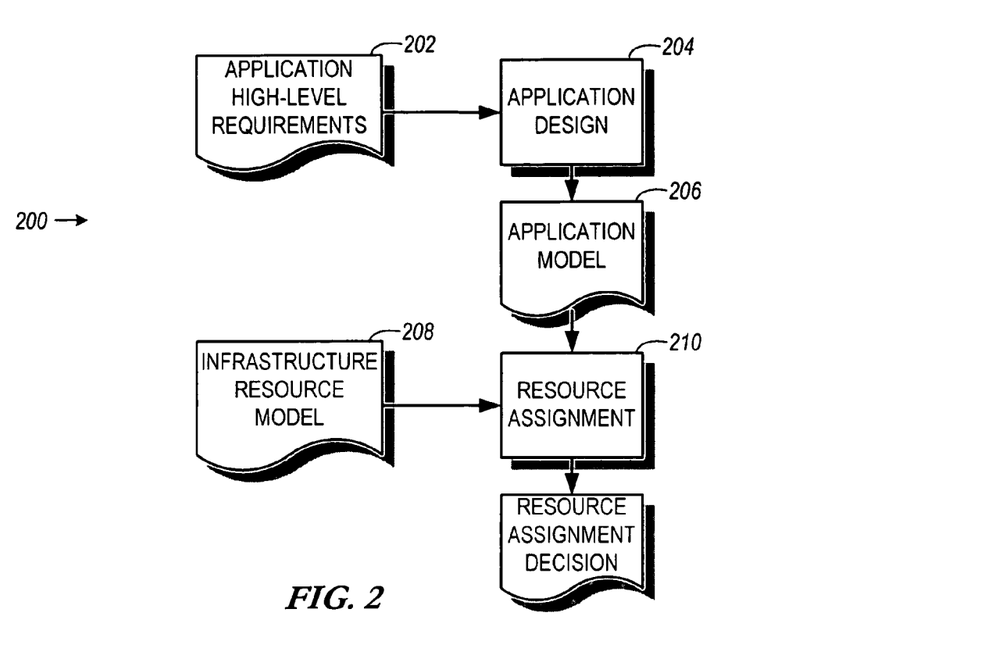
FIG. 2 is a process chart illustrating inputs to a resource assignment problem according to embodiments of the invention.

In FIG. 2, a two-step process 200 for mapping requirements to resources according to embodiments of the present invention is shown. The first step is referred to as "application design" 204, and involves translating the application's high-level requirements 202 into an application model 206 that represents the low-level processing, communication and storage requirements on the physical resources. The application design step 204 requires domain knowledge and experience with the specific application, and typically involves benchmarking exercises.

The application model 206 is used together with an infrastructure resource model 208 as input to the next step, resource assignment 210. Resource assignment 210 involves deciding whether sufficient server and network resources exist in the infrastructure to accommodate the application's resource requirements, and if so, choosing the specific instances of resources from the infrastructure for use by the applications. If, however, resource assignment 210 decides that no sufficient resources exist, then the application is denied admission into the computing utility. The resource assignment step 210 requires knowledge of both the physical resources and application requirements contained in the application and resource models 206, 208. The resulting resource assignment decision is then fed into an application deployment engine, which configures the switches and servers and installs associated application components on the servers.

The concepts described herein are generally directed to solving the second step, resource assignment 210. The resource assignment problem is defined as follows: For a given topology of a network consisting of switches and servers with varying capabilities, and for a given application with a distributed architecture, decide which server from the physical network should be assigned to each application component, such that the traffic-weighted average inter-server distance is minimized, and the application's processing, communication and storage requirements are satisfied without exceeding network capacity limits.

Figure 3:
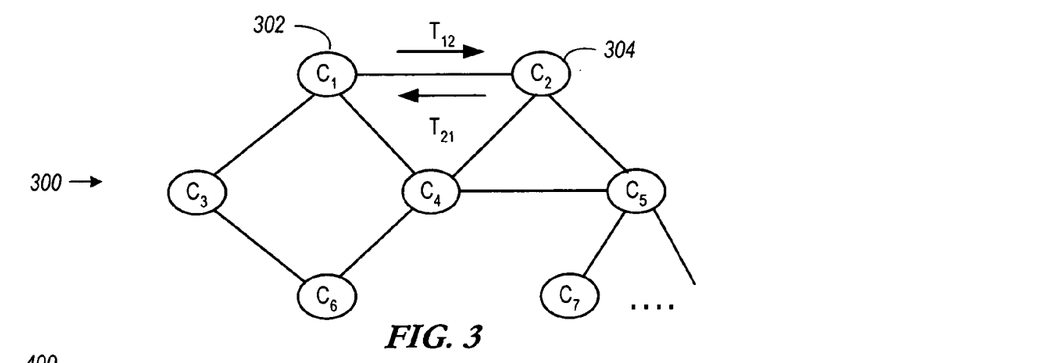
FIG. 3 is a graph illustrating an application model diagram according to embodiments of the invention.

An application can be characterized by a set of components that communicate with one another in a certain way. An application model diagram according to embodiments of invention is shown in FIG. 3. The application can be represented by a directed graph $G(C, L)$ 300, where each node $c \in C$ (e.g., 302, 304) represents an application component, and each directed edge $l=(c, c') \in L$ is an ordered pair of component nodes, representing communication from component c to component c'. The matrix T is defined to characterize the traffic pattern of the application. Each element $T_{cc'}$ represents the maximum amount of traffic going from component c to component c'. $T_{cc'}=0$ if an edge (c,c') does not exist, indicating no traffic flows from component c to component c'.

Each application component has requirements on the type of servers on which it can be hosted. Let P to be the set of server attributes (or properties) that are of interest to a particular application, such as processor type, processor speed, number of processors, memory size, disk space, and so on. Then for each attribute $p \in P$ and each application component $c \in C$, the requirement is characterized by a set $VREQ_{cp}$, which contains the permissible values of attribute p for component c. This set may be either discrete or continuous. For example, an application component may require a server's processor architecture to be in {SPARC, PA_RISC}, and its processor speed to be in an interval [500, 1000] (in MHz).

Figure 4:
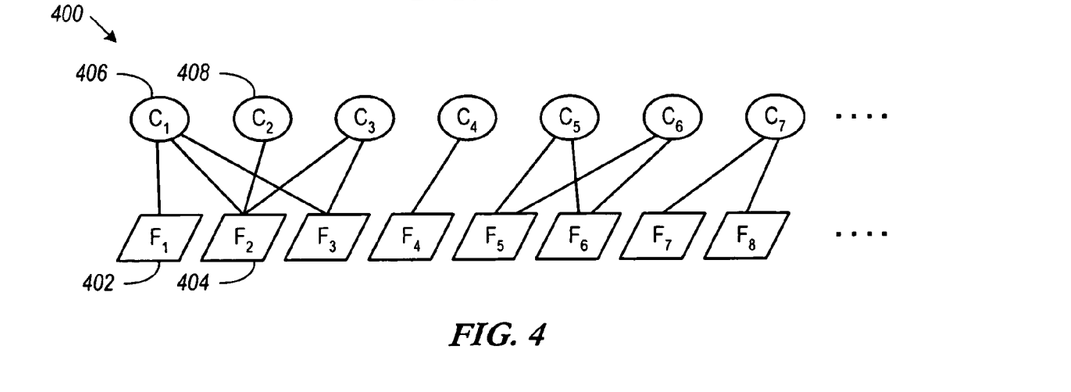
FIG. 4 is a graph illustrating component-to-file mapping according to embodiments of the invention.

Referring now to FIG. 4, a model for storage requirements is illustrated according to embodiments of the invention. The storage access pattern of applications can be represented by a bipartite graph 400. It may be assumed that data for an application can be divided into a set of "files" (e.g., 402, 404). Here a file may represent any logically contiguous chunk of data that may be accessed by application components (e.g., 406, 408). The example illustrates that the mapping between an application component and a file is not one-to-one. More specifically, each component may access multiple files, and each file may be accessed by more than one component.

The above application model can be used for simultaneous assignment of resources to multiple applications. A single large graph can be constructed with all the components from all the applications, where each application is represented by a sub-graph.

With this in mind, the application model contains the sets and parameters shown below in Table 1.

TABLE 1

Sets and Indices:

| | |
|---|---|
| $c \in C$ | Set of application components. |
| $f \in F$ | Set of files to be placed on storage devices. |
| $l \in L$ | Set of directed links in the application architecture graph. |
| $c' \in N_c$ | Set of components that communicate with component c, i.e., $N_c = \{c' \in C: (c, c') \in L\}$. |
| $p \in P$ | :Set of server attributes required by the application. |

Parameters:

| | |
|---|---|
| T | $\|C\| \times \|C\|$ –dim matrix. $T_{cc'}$ is the amount of traffic from component c to component c'. |
| TCF | $\|C\| \times \|F\|$ –dim matrix. $TCF_{cf}$ is the amount of write traffic from component c to file f. |
| TFC | $\|F\| \times \|C\|$ –dim matrix. $TFC_{fc}$ is the amount of read traffic from file f to component c. |
| TO | $\|C\|$ –dim vector. $TO_c = \sum_{c' \in N_c} T_{cc'}$ is the total amount of LAN traffic originating from component c. |
| TI | $\|C\|$ –dim vector. $TI_c = \sum_{c' \in N_c} T_{c'c}$ is the total amount of LAN traffic received from component c. |
| $VREQ_{cp}$: | The set of the permissible values of attribute p for component c. |

The following paragraphs describe the mathematical models for the processing, networking and storage resources in a computing utility. The collection of resources as a whole is referred to as the "utility fabric", which includes servers that can be assigned to applications, the local area networking (LAN) fabric (e.g., Ethernet) that connects the servers to each other, and the storage area network (SAN) fabric that connects the servers to the centralized storage devices.

Let S be the set of servers in the physical network. The notion of a "server" here is not restricted to a compute server. It can be a firewall, a load balancer, a network attached storage (NAS) device, a VPN gateway, or any other device an application may need as a component. An attribute "server type" is used to distinguish between different kinds of servers. Due to the inherent heterogeneity of resources in a large computing utility, even the same type of servers may have different processor architecture and processing power. Therefore, more attributes are used to describe a server. The value for each attribute may be fixed, or configurable. For example, a server may have a server may have an "IA32" architecture, a CPU speed of 550 MHZ, but its memory size is changeable between 4 and 8 MB. For each server s∈S, the set $V_{sp}$ is used to represent its possible values for attribute p∈P.

Before describing the mathematical models for the networking fabric, a common set of networking assumptions may be made to simplify the models. All the network links are assumed to be duplex links and traffic can flow in either direction. In addition, link capacities for the two directions can be different. For any physical link in any direction, its "link capacity" is indeed the minimum of the bandwidth capacities of the link, the source port and the destination port.

Multiple physical links between two devices that are all active and load balanced are combined into one logical link with aggregated capacity. For example, four 1 Gbit/sec physical links can be combined to form one 4 Gbit/sec link in the logical topology. This simplification is valid when the combined links have equal bandwidth and share approximately equal load, which is typically true. This is also the case if trunking technology is applied on the links.

If two switches appear in a redundant pair to avoid single point of failure, then redundant paths exist between at least one pair of devices in the physical topology. This can be simplified in different ways depending on the network protocol the switches implement. For example, in the LAN fabric, the spanning tree protocol may be enforced, resulting in all the redundant paths between two network devices being blocked except one. If two switches in a redundant pair are both active and being load balanced, then the switches or servers that are connected to these two switches can be partitioned into two sets, one under each switch. And the cross links will be blocked.

Similarly, the SAN fabric may implement the Fabric Shortest Path First (FSPF) protocol, which assures uniform traffic load sharing over equivalent paths. Moreover, the two links in the same segment of the two paths usually have the same bandwidth. As a consequence, a pair of redundant switches can be merged into one switch. Corresponding links will also be merged to form a bigger link with aggregated bandwidth.

These simplifying assumptions may be applied to both the LAN and the SAN fabrics as they are represented using mathematical models. It may be assumed that the logical topology of the LAN fabric in the computing utility is a tree. This is a reasonable assumption given that a layer-two switched network often implements the spanning tree protocol, guaranteeing that there is one and only one active path between two network devices. The tree network topology significantly simplifies the formulation of the problem later on.

Figure 5:
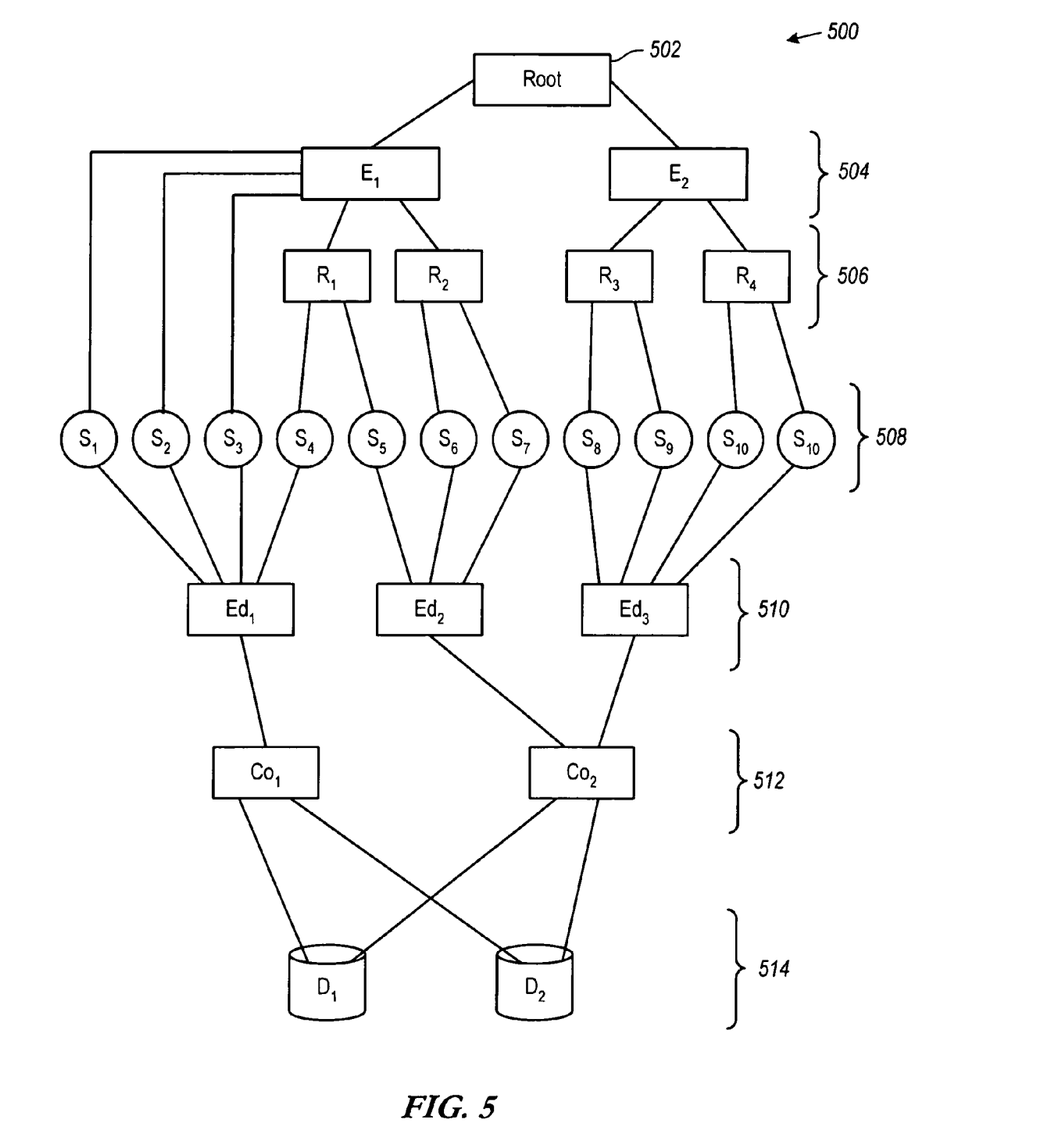
FIG. 5 is a network topology map for applying resource assignment according to embodiments of the invention.

In reference now to FIG. 5, an example of the LAN fabric topology 500 is shown according to various embodiments of the invention. At the top is a switching/routing device 502 that connects the utility fabric to the Internet or other utility fabrics. This device 502 may be referred to as a root switch. Below the root switch 502 is a set of edge switches 504, and below the edge switches 504 is a set of rack switches 506. Servers 508 are directly connected to either an edge switch 504 or a rack switch 506. As the figure shows, an edge switch 504 can be connected to a set of rack switches 506, a set of servers 508, or a combination of both.

The three-layer network shown in FIG. 5 is chosen for demonstration purposes. It will be appreciated that the models described herein may be adapted for any LAN fabric topology that can be represented as a tree. Therefore the methodology described herein may be applied to a tree network with fewer layers or more layers.

The mathematical model for the LAN contains the following sets and parameters shown below in Table 2.

TABLE 2

Sets and Indices

| | |
|---|---|
| $s \in S$ | Set of servers. |
| $r \in R$ | Set of rack switches in the LAN. |
| $e \in E$ | Set of edge switches in the LAN. |
| $R_e \subset R$ | Set of rack switches connected to edge switch e in the LAN. |
| $SR_r \subset S$ | Set of servers connected to LAN rack switch r. |
| $SE_e \subset S$ | Set of servers connected (directly or indirectly) under LAN edge switch e. |
| $p \in P$: | Set of server attributes required by the application. |

Parameters:

| | |
|---|---|
| $BSI_s$ | The incoming bandwidth of server s. |
| $BSO_s$ | The outgoing bandwidth of server s. |

TABLE 2-continued

| | |
|---|---|
| $BRI_r$ | The incoming bandwidth of rack switch r. |
| $BRO_r$ | The outgoing bandwidth of rack switch r. |
| $BEI_e$ | The incoming bandwidth of edge switch e. |
| $BEO_e$ | The outgoing bandwidth of edge switch e. $V_{sp}$: Set of possible values for attribute p of server s. |

For easy indexing, each logical link in the network is associated with a device with which it may be uniquely identified. For example, the link that connects server s to a rack or edge switch is associated with that server and its downstream/upstream bandwidth is referred to as the incoming/outgoing bandwidth of server s. The same rule applies to the links at the upper layers.

Various SAN topologies have been used in practice. The popular ones include ring, cascade, mesh, and core/edge topologies. Among these, the core/edge topology provides better resiliency, scalability, flexibility and throughput, and is adopted by many vendors and SAN designers. Therefore, it will be assumed that the SAN fabric in a computing utility has a core/edge topology. The lower portion of FIG. 5 exemplifies a SAN with this topology.

The core/edge topology contains two layers of switches. The core layer consists of at least one pair of redundant core switches 512 that are typically the most powerful. All the other switches connected to the core switches 512 are referred to as edge switches 510. The centralized storage devices 514, such as disk arrays, are attached directly to the core switches 512, and the servers 508 are attached directly to the edge switches 510. The above topology ensures that every storage device 514 is accessible by any server 508 in the SAN. Note that this logical topology is a simplification from the physical topology with redundancies in network devices and links.

The mathematical model for the SAN contains sets and parameters shown below in Table 3.

TABLE 3

| | |
|---|---|
| Sets and indices: | |
| s ∈ S | Set of servers. |
| d ∈ D | Set of storage devices. |
| k ∈ K | Set of FC core switches in the SAN. |
| g ∈ G | Set of FC edge switches in the SAN. |
| $SED_g \subset S$ | Set of servers connected to FC edge switch g. |
| $SCO_k \subset S$ | Set of servers (indirectly) connected to FC core switch k. |
| Parameters: | |
| BDC | $\|D\| \times \|K\|$-dim matrix. $BDC_{dk}$ is the bandwidth of the FC link going from storage device d to core switch k. |
| BCD | $\|K\| \times \|D\|$-dim matrix. $BCD_{kd}$ is the bandwidth of the FC link going from core switch k to storage device d. |
| BCE | $\|G\|$-dim vector. $BCE_g$ is the bandwidth of the FC link going from a core switch to edge switch g. |
| BEC | $\|G\|$-dim vector. $BEC_g$ is the bandwidth of the FC link going from edge switch g to a core switch. |
| BES | $\|S\|$-dim vector. $BES_s$ is the bandwidth of the FC link going from an edge switch to server s. |
| BSE | $\|S\|$-dim vector. $BSE_s$ is the bandwidth of the FC link going from server s to an edge switch. |

The resource assignment problem concerns selecting the right server in the utility fabric for each application component, represented by the following matrix of binary variables: For all c∈C and s∈S, $$x_{cs} = \begin{cases} 1 & \text{server } s \text{ assigned to component } c; \\ 0 & \text{otherwise.} \end{cases}$$

In addition, the following two matrices of binary variables are defined. For all c∈C, r∈R, and e∈E, $$zr_{cr} = \begin{cases} 1 & \text{rack switch } r \text{ assigned to component } c; \\ 0 & \text{otherwise.} \end{cases}$$

$$ze_{ce} = \begin{cases} 1 & \text{edge switch } e \text{ assigned to component } c; \\ 0 & \text{otherwise.} \end{cases}$$

It may be assumed a switch is assigned to a component if at least one server connected (directly or indirectly) under the switch is assigned to that component. Note that these two variables are redundant to the variables $x_{cs}$. They are introduced to help express the Ethernet bandwidth constraints in a more succinct way, and to make solving of the problem more efficient.

Resources in a computing utility can be assigned to application components based on many criteria, such as application performance, resource utilization, operator policies, or economic concerns. These can be associated with different objective functions of the optimization problem. As formulated herein, the objective function used in the node placement optimization problem is chosen, which minimizes the traffic-weighted average inter-server distance where distance is measured in terms of network hop count. Let $DIST_{ss'}$ be the distance between two servers s and s', and $TSS_{ss'}$ be the amount of LAN traffic from server s to server s' as a result of server assignment. Then the objective function is:

$$\text{Min } J1 = \sum_{s,s' \in S} DIST_{ss'} * TSS_{ss'}.$$

As may be apparent, $$TSS_{ss'} = \sum_{c \in C} \sum_{c' \in N_c} x_{cs} T_{cc'} x_{c's'}.$$

The value of $DIST_{ss'}$ depends on the relative location of server s and s'. For example, $DIST_{ss'}=2$ if both servers are directly connected to the same switch, which is a preferred situation if these two servers communicate heavily.

By dividing the set of all server pairs into a number of subsets, each with a different $DIST_{ss'}$ value, then calculating the summation on each subset and adding them up, this results in:

$$J1 = 2\sum_{c \in C}(TO_c + TI_c) + \sum_{r \in R}\sum_{c \in C} zr_{cr}(TO_c + TI_c) - 2\sum_{r \in R}\sum_{c \in C}\sum_{c' \in N_c} zr_{cr}T_{cc'}zr_{c'r} - \sum_{e \in E}\sum_{c \in C}\sum_{c' \in N_c} 2ze_{ce}T_{cc'}ze_{c'e}.$$

The first term is the total amount of traffic originated from and received by all the components, which is a constant. Therefore, an equivalent objective function follows:

$$\text{Min } J2 = \sum_{r \in R} \sum_{c \in C} zr_{cr}(TO_c + TI_c) -$$

$$2\sum_{r \in R} \sum_{c \in C} \sum_{c' \in N_c} zr_{cr}T_{cc'}zr_{c'r} - \sum_{e \in E} \sum_{c \in C} \sum_{c' \in N_c} 2ze_{ce}T_{cc'}ze_{c'e}.$$

This is a quadratic function of the binary variables $zr_{cr}$ and $ze_{ce}$. The first term represents the total amount of traffic originated and received under all the rack switches. A similar term for all the edge switches, $$\sum_{e \in E} \sum_{c \in C} ze_{ce}(TO_c + TI_c),$$

would have been present, but was removed as part of the constant term. The second and third terms together capture the total amount of intra-switch traffic at all the switches. Here "intra-switch traffic" is defined as the traffic flows whose source and destination nodes are servers under the same switch. The intuition is, as components that communicate heavily are placed close to each other in the network, the amount of intra-switch traffic is increased, which in turn results in smaller value for the objective function. In general, this leads to lower communication delay between application components inside the LAN fabric.

SAN latency is not included in the objective function for the following two reasons. First, the SAN topology in this problem has the property that the number of hops for each data flow is fixed at three because any server and storage device pair is connected through two FC switches. This means, any server assignment solution results in the same SAN latency measure. Second, storage systems latency is dominated by I/O access at the storage device, which is typically several orders of magnitude larger than the SAN latency. Therefore, even if the number of hops could be reduced between a server and a storage device, it is inconsequential with respect to storage access latency. On the other hand, link capacity in the SAN is usually a concern in storage systems performance. Given the high cost of SAN switches, grossly over-provisioning may not be preferred, while at the same time it is not desirable to allow the SAN fabric to be easily saturated. With this observation, the SAN link capacity in RAP is handled without adding any new objective function. The rest of this section describes constraints in the problem that limit the search space for optimal server assignment solutions.

Before describing constraints in the RAP, a server feasibility matrix FS is defined, where:

$$FS_{cs} = \begin{cases} 1 & \text{switch } s \text{ meets the processing, networking,} \\ & \text{and I/O requirements of component } c; \\ 0 & \text{otherwise.} \end{cases}$$

More specifically, $FS_{cs}=1$ if and only if $$V_{sp} \cap VREQ_{cp} \neq \phi, \forall_p \in P \quad \{a\}$$

$$\sum_{c' \in N_c} T_{c'c} \leq BSI_s \text{ and } \sum_{c' \in N_c} T_{cc'} \leq BSO_s \quad \{b\}$$

$$\sum_{f \in F} TCF_{cf} \leq BSE_s \text{ and } \sum_{f \in F} TFC_{cf} \leq BES_s \quad \{c\}$$

Condition {a} ensures that server s matches the server attribute requirement by component c. Condition {b} ensures that the aggregate LAN traffic at each component c does not exceed the link bandwidth of server s in either direction. And condition {c} guarantees that the total amount of SAN traffic at each component c does not exceed the I/O bandwidth of server s in either direction.

The server feasibility matrix can be pre-computed before the optimization problem is solved. When the matrix FS is sparse, the search space for the optimization problem can be significantly reduced.

Similarly, feasibility matrices FR and FE can be defined for rack and edge switches, respectively, where $FR_{cr}=1$ if there is at least one feasible server under rack switch r for component c, $FE_{ce}=1$ if there is at least one feasible server under edge switch e for component c. These two matrices can also be pre-computed.

The constraints on the decision variables are as follows.

Normality constraints: One and only one server is assigned to each application component:

$$\sum_{s \in S} x_{cs} = 1, \quad \forall c \in C. \quad \{1\}$$

Each server can be assigned to at most one component:

$$\sum_{c \in C} x_{cs} \leq 1, \quad \forall s \in S. \quad \{2\}$$

Variable relationship constraints: A rack switch is assigned to a component if and only if a server under this rack switch is assigned to this component:

$$\sum_{s \in SR_r} x_{cs} = zr_{cr}, \quad \forall c \in C, r \in R. \quad \{3\}$$

An edge switch is assigned to a component if and only if a server under this edge switch is assigned to this component:

$$\sum_{s \in SE_e} x_{cs} = ze_{ce}, \quad \forall c \in C, e \in E. \quad \{4\}$$

LAN fabric constraints: The LAN traffic going out of each rack switch to an edge switch does not exceed the link capacity:

$$\sum_{c \in C} TO_c zr_{cr} - \sum_{c \in C} \sum_{c' \in N_c} zr_{cr}T_{cc'}zr_{c'r} \leq BRO_r, \quad \forall r \in R. \quad \{5\}$$

Remember that $TO_c$ is the total amount of LAN traffic originating from component c. On the left hand side, the first item represents the total amount of traffic originating under rack switch r, and the second item represents the amount of intra-switch traffic at this switch. Hence, the left hand side represents the amount of traffic passing through switch r, which should be bounded by the outgoing link bandwidth at the switch.

The derivation of the following three constraints is similar, therefore will be omitted. The LAN traffic coming into each rack switch from an edge switch does not exceed the link capacity:

$$\sum_{c \in C} Tl_c zr_{cr} - \sum_{c \in C} \sum_{c' \in N_c} zr_{cr} T_{cc'} zr_{c'r} \le BRI_r, \quad \forall r \in R \qquad \{6\}$$

Remember that $TI_c$ is the total amount of LAN traffic received by component c.

The LAN traffic going out of each edge switch to the root switch does not exceed the link capacity:

$$\sum_{c \in C} TO_c ze_{c,e} - \sum_{c \in C} \sum_{c' \in N_c} ze_{ce} T_{cc'} ze_{c'e} \le BEO_e, \quad \forall e \in E. \qquad \{7\}$$

The LAN traffic coming into each edge switch from the root switch does not exceed the link capacity:

$$\sum_{c \in C} Tl_c ze_{ce} - \sum_{c \in C} \sum_{c' \in N_c} ze_{ce} T_{cc'} ze_{c'e} \le BEI_e, \quad \forall e \in E. \qquad \{8\}$$

SAN fabric constraints: The SAN traffic going out of each FC edge switch to a core switch does not exceed the link capacity:

$$\sum_{s \in SED_g} \sum_{f \in F} \sum_{c \in C} TCF_{cf} x_{cs} \le BEC_g, \quad \forall g \in G. \qquad \{9\}$$

The SAN traffic coming into each FC edge switch from a core switch does not exceed the link capacity:

$$\sum_{s \in SED_g} \sum_{f \in F} \sum_{c \in C} TFC_{fc} x_{cs} \le BCE_g, \quad \forall g \in G. \qquad \{10\}$$

The SAN traffic from an FC core switch to a storage device does not exceed the link capacity:

$$\sum_{s \in SCO_k} \sum_{f \in F} \sum_{c \in C} TCF_{cf} x_{cs} Y_{fd} \le BCD_{kd}, \quad \forall k \in K, d \in D \qquad \{11\}$$

Here $Y_{fd}$ is a binary parameter, where $Y_{fd}=1$ if and only if file f is placed on storage device d. The file placement problem can be separated from the server assignment problem. The former has $Y_{fd}$ as its decision variable. The solution is fed into the RAP problem as an input.

The SAN traffic from a storage device to an FC core switch does not exceed the link capacity.

$$\sum_{s \in SCO_k} \sum_{f \in F} \sum_{c \in C} TFC_{fc} x_{cs} Y_{fd} \le BDC_{dk}, \quad \forall k \in K, d \in D \qquad \{12\}$$

Feasibility constraints: All the variables are binary, and all the assigned servers, rack switches, and edge switches are feasible.

$$x_{cs} \in \{0, FS_{cs}\}, zr_{cr} \in \{0, FR_{cr}\}, ze_{ce} \in \{0, FE_{ce}\} \qquad \{13\}$$

In summary, the complete formulation of the optimization problem for RAP is $$\text{Min } J2 = \sum_{r \in R} \sum_{c \in C} zr_{cr}(TO_c + Tl_c) -$$

$$2 \sum_{r \in R} \sum_{c \in C} \sum_{c' \in N_c} zr_{cr} T_{cc'} zr_{c'r} - \sum_{e \in E} \sum_{c \in C} \sum_{c' \in N_c} 2 ze_{ce} T_{cc'} ze_{c'e}$$

subject to $\{1\}$-$\{13\}$ above. This is a nonlinear combinatorial optimization problem, which has been proven as NP-hard. This problem is referred to as the original formulation of RAP and labeled as RAP0. The problem formulation described above can be applied to a number of different use cases, some of which are shown in Table 4.

TABLE 4

| Use Case | Description |
|---|---|
| Green-field assignment | This occurs when the first application is initially deployed in an empty utility. |
| Subsequent assignment | This occurs when there are existing applications running in the utility, and resources are assigned to the next application. In this case, the same application and resource models can be used, except that parameters in the resource model should reflect the remaining resource capacity. |
| Multiple applications assignment | This occurs when resources need to be assigned to more than one application at the same time. A larger application model with components from multiple applications can be used for this purpose. |
| Dynamic assignment | This occurs when an existing application requests for more resources as its real time workload intensity changes. In this case, a new application model will be submitted containing the additional requirement. Depending on the application's ability to accommodate server migration, the problem can be resolved with or without fixing the existing server assignment. |
| Automatic fail over | This occurs when a server without high-availability configuration fails and needs replacement. The best server to use from the pool of available servers can be found using a similar RAP formulation |

The first three use cases happen at application deployment time, while the last two use cases are useful at run time. Therefore, the former is at a time scale of days or longer, while the latter may be at a shorter time scale of minutes or hours.

The number of binary variables in RAP0 is $|C| \times (|S|+|R|+|E|)$, which is dominated by $|C| \times |S|$, the number of application components times the number of servers in the utility. It is conceivable that the problem becomes computationally more challenging as the infrastructure size or application size grows. Any heuristic search algorithms are not guaranteed to find a feasible and optimal solution. The next section presents two linearized formulations as mixed integer programming problems, which can be solved directly using a commercial solver, such as CPLEX.

As previously described, the original formulation RAP0 is nonlinear because the objective function and the LAN fabric constraints {5}-{8} are quadratic in binary variables $zr_{cr}$, and $ze_{ce}$. This type of nonlinearity can be removed using a standard substitution technique with the observation that the product of binary variables is also binary. First, the following set of binary variables are defined, $yr_{cc'r} = zr_{cr} zr_{c'r}$ and $ye_{cc'e} = ze_{ce} ze_{c'e}$, for all $c,c' \in C$, $r \in R$, $e \in E$.

With these new variables, the objective function can be rewritten as $$\text{Min } J2 = \sum_{r \in R} \sum_{c \in C} zr_{cr}(TO_c + TI_c) - 2 \sum_{r \in R} \sum_{c \in C} \sum_{c' \in N_c} T_{cc'} yr_{cc'r} - 2 \sum_{e \in E} \sum_{c \in C} \sum_{c' \in N_c} T_{cc'} ye_{cc'e}.$$

This is a linear combination of all the $zr_{cr}$, $yr_{cc'r}$ and $ye_{cc'e}$ variables. Similarly, constraints {5} through {8} in RAP0 can be rewritten as linear constraints as follows:

$$\sum_{c \in C} TO_c zr_{cr} - \sum_{c \in C} \sum_{c' \in N_c} T_{cc'} yr_{cc'r} \leq BRO_r, \forall r \in R \quad \{5I\}$$

$$\sum_{c \in C} TI_c zr_{cr} - \sum_{c \in C} \sum_{c' \in N_c} T_{cc'} yr_{cc'r} \leq BRI_r, \forall r \in R \quad \{6I\}$$

$$\sum_{c \in C} TO_c ze_{ce} - \sum_{c \in C} \sum_{c' \in N_c} T_{cc'} ye_{cc'e} \leq BEO_e, \forall e \in E \quad \{7I\}$$

$$\sum_{c \in C} TI_c ze_{ce} - \sum_{c \in C} \sum_{c' \in N_c} T_{cc'} ye_{cc'e} \leq BEI_e, \forall e \in E. \quad \{8I\}$$

Additional constraints are used to ensure that the $yr_{cc'r}$ variables behave as the product of binary variables. First, to ensure that $zr_{cr}=0$ or $zr_{c'r}=0 \Rightarrow yr_{cc'r}=0$, the following is used:

$$zr_{cr} \geq yr_{cc'r}, zr_{c'r} \geq yr_{cc'r} \quad \forall c,c' \in C, r \in R. \quad \{13I\}$$

Second, to ensure $zr_{cr}=1$ and $zr_{c'r}=1 \Rightarrow yr_{cc'r}=1$, the following constraint is used:

$$zr_{cr} + zr_{c'r} - yr_{cc'r} \leq 1 \quad \forall c,c \in C, r \in R.$$

However, since the objective function is to maximize a summation of the $yr_{cc'r}$ variables with non-negative coefficients, the second set of constraints are implied by the first set of constraints at optimality, and therefore are not required. Similarly, the following set of constraints should be imposed on the new $ye_{cc'e}$ variables:

$$ze_{ce} \geq ye_{cc'e}, ze_{c'e} \geq ye_{cc'e} \quad \forall c,c' \in C, e \in E.$$

Note that the new $yr_{cc'r}$ and $ye_{cc'e}$ variables only need to be continuous in the interval [0,1] instead of being binary. For example, based on the above discussion, constraint {13I} and the maximization nature of the objective function together ensure that $yr_{cc'r}$ behaves exactly as the product of $zr_{cr}$ and $zr_{c'r}$. Since $zr_{c'r}$ and $zr_{cr}$ are both binary, $yr_{cc'r}$ never really takes a fractional value between 0 and 1'.

The above substitution of variables results in a linear optimization problem with some integer variables and some continuous variables, thus a mixed integer programming problem. It is referred to as RAP-LINI, to be distinguished from the original nonlinear formulation RAP0. The main issue with this formulation is that the number of variables may be significantly higher than that of RAP0 with the introduction of $|C| \times |C| \times (|R|+|E|)$ continuous variables. There are a number of ways to improve the efficiency in solving the problem.

First, the number of $yr_{cc'r}$ and $ye_{cc'e}$ variables can be reduced in the following way: $yr_{cc'r}$ is defined if and only if $FR_{cr}=1$, $FR_{c'r}=1$, and $T_{cc'}>0$; and $ye_{cc'e}$ is defined if and only if $FE_{ce}=1$, $FE_{c'e}=1$, and $T_{cc'}>0$. In all the other cases, the $yr_{cc'r}$ and $ye_{cc'e}$ variables are not needed in the formulation. This implies that, in the worst case where all the rack and edge switches are feasible for all the components, the number of extra variables in RAP-LINI is $|L| \times (|R|+|E|)$, i.e., the number of communication links in the application graph times the total number of LAN switches.

A second way of improving efficiency is to realize that, since the number of $zr_{cr}$ and $ze_{ce}$ variables ($|C| \times (|R|+|E|)$) is usually significantly less than the number of $x_{cs}$ variables $|C| \times |S|$, the efficiency of the branch and bound algorithm in the MIP solver can be increased by assigning higher priority to branching on variables $ze_{ce}$ and $zr_{cr}$.

The RAP-LINI uses a linearization technique that is straightforward and that results in a MIP formulation with $|L| \times (|R|+|E|)$ additional continuous variables than RAP0. This subsection describes a relatively more sophisticated linearization scheme, which leads to another MIP formulation with possibly fewer extra variables.

When looking at the LAN traffic flowing through each rack switch, it will be appreciated that, for all $c \in C$ and $r \in R$, $zr_{cr} \cdot TO_c$, is the amount of traffic originating from component c under switch r, and $$\sum_{c' \in N_c} zr_{c'r} T_{cc'}$$

is the amount of traffic originating from component c and received under switch r. Now a define a new variable, $$tro_{cr} = zr_{cr} TO_c - zr_{cr} \sum_{c' \in N_c} zr_{c'r} T_{cc'},$$

which captures the amount of traffic that originated from component c under switch r and leaves switch r.

By definition of $zr_{cr}$, $$tro_{cr} = \begin{cases} zr_{cr} TO_c - \sum_{c' \in N_c} zr_{c'r} T_{cc'}, & \text{if } zr_{cr} = 1; \\ 0, & \text{if } zr_{cr} = 0. \end{cases}$$

Therefore, $tro_{cr}$ can be equivalently defined as, $$tro_{cr} = \max \left\{ zr_{cr} TO_c - \sum_{c' \in N_c} zr_{c'r} T_{cc'}, 0 \right\}$$

Since $tro_{cr}$ represents the amount of outgoing traffic from component c that passes through rack switch r, and the objective function tends to reduce the amount of traffic that passes through switches, the above definition can be enforced using the following two linear constraints:

$$tro_{cr} \geq zr_{cr}TO_c - \sum_{c' \in N_c} zr_{c'r}T_{cc'} \text{ and } tro_{cr} \geq 0 \quad \{13\text{II}\}$$

That is, these constraints will be binding at optimality.

Using the new variables $tro_{cr}$, the rack switch outgoing bandwidth constraint {5} in RAP0 can be rewritten as $$\sum_{c \in C} tro_{cr} \leq BRO_r, \forall r \in R \quad \{5\text{II}\}$$

Similarly, the amount of LAN traffic originating from component c that leaves edge switch e can be represented using the following new variable:

$$teo_{ce} = ze_{ce}TO_c - ze_{ce}\sum_{c' \in N_c} ze_{c'e}T_{cc'}.$$

This would be enforced by the following constraints:

$$teo_{ce} \geq ze_{ce}TO_c - \sum_{c' \in N_c} ze_{c'e}T_{cc'} \text{ and } teo_{ce} \geq 0 \quad \{15\text{II}\}$$

Then constraint {7} of RAP0 can be rewritten as $$\sum_{c \in C} teo_{ce} \leq BEO_e, \forall e \in E \quad \{7\text{II}\}$$

Analogous variables $tri_{cr}$ ($tei_{ce}$) representing the amount of incoming traffic to component c under rack switch r (edge switch e) from components outside the switch can be defined, with the following additional constraints:

$$tri_{cr} \geq zr_{cr}TI_c - \sum_{c' \in N_c} zr_{c'r}T_{c'c} \text{ and } tri_{cr} \geq 0 \quad \{14\text{II}\}$$

$$tei_{ce} \geq ze_{ce}TI_c - \sum_{c' \in N_c} ze_{c'e}T_{c'c} \text{ and } tei_{c,e} \geq 0 \quad \{16\text{II}\}$$

Then constraints {16} and {18} of RAP0 can be rewritten as $$\sum_{c \in C} tri_{cr} \leq BRI_r, \forall r \in R \quad \{6\text{II}\}$$

$$\sum_{c \in C} tei_{ce} \leq BRI_e, \forall e \in E \quad \{8\text{II}\}$$

By comparing the definition of the new variables with the objective function J2 in RAP0, it can be seen that, $$J2 = \sum_{r \in R}\sum_{c \in C}(tro_{cr} + tri_{cr}) + \sum_{e \in E}\sum_{c \in C}(teo_{ce} + tei_{ce}) - \sum_{e \in E}\sum_{c \in C}ze_{ce}(TO_c + TI_c)$$

Since $$\sum_{e \in E}\sum_{c \in C}ze_{ce}(TO_c + TI_c) = \sum_{c \in C}(TO_c + TI_c)$$

is a constant, an equivalent objective function is the following.

$$\text{Min } J3 = \sum_{r \in R}\sum_{c \in C}(tro_{cr} + tri_{cr}) + \sum_{e \in E}\sum_{c \in C}(teo_{ce} + tei_{ce})$$

The interpretation of the objective function follows. To reduce the traffic-weighted average inter-server distance, it is equivalent to minimize the total amount of traffic flowing on all the Ethernet links. Because the total amount of traffic originating from and received by all the application components is a constant, the total amount of traffic flowing on all the server-to-switch links is a constant. Therefore, an equivalent objective function is to minimize the total amount of inter-switch traffic, which is exactly what J3 is. The term "inter-switch traffic" refers to the traffic flowing on a link that connects two switches. These links are typically more expensive. And they are more likely to get saturated because they are often shared by multiple components, or even multiple applications. By minimizing the utilization of these shared links by a single application, the likelihood of creating bottlenecks in the LAN fabric is decreased.

This MIP formulation of the resource assignment problem is referred to as RAP-LINII. In this case, a total number of $2|C|\times(|R|+|E|)$ new continuous variables are introduced. This approach involves fewer extra variables than the RAP-LINI approach if $2|C|<|L|$, i.e., if each application component has, on average, more than 2 incident links.

In case studies performed on the two mixed-integer processing formulations (RAP-LINI, RAP-LINII), the RAP-LI-NII formulation was found to be more efficient.

Figure 6:
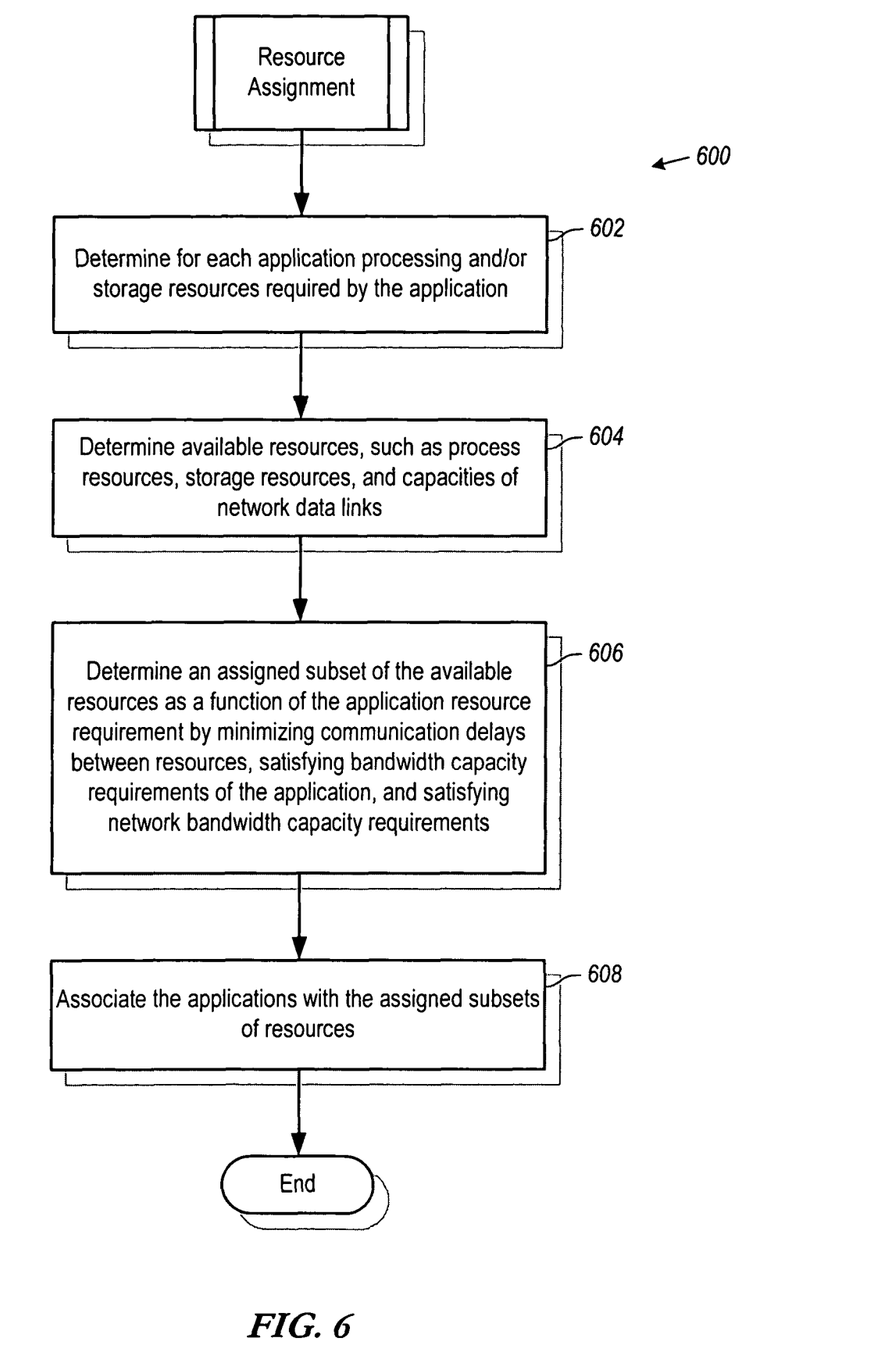
FIG. 6 is a flowchart showing steps of resource assignment according to embodiments of the invention.

In reference now to FIG. 6, a flowchart 600 shows steps in performing the resource assignment according to embodiments of the invention. The "application design" step (602) may first be performed, which involves determining for each application a set of processing and storage resources required by the application. The system parameters are also determined (604), including available process resources, storage resources, and capacities of network data links. These resources may be considered constant or variable depending on the application (e.g., application deployment time versus automatic fail-over).

Once the application and network resources have been defined, the resource assignment problem can be solved (606). This typically involves determining an assigned subset of the available resources as a function of the application resource requirements and the available resources. The solution may involve minimizing communication delays between resources, satisfying server attribute and bandwidth capacity requirements of the application, and satisfying network bandwidth limits. The solution (606) may utilize any of the described formulations for linearizing the Ethernet fabric constraints (e.g., RAP-LINI, RAP-LINII). The formulation may be chosen based on computing efficiency. Finally, the solution obtained is used to associate (608) the applications with the assigned subset of resources.

From the description provided herein, those skilled in the art are readily able to combine hardware and/or software created as described with appropriate general purpose or system and/or computer subcomponents embodiments of the invention, and to create a system and/or computer subcomponents for carrying out the method embodiments of the invention. Embodiments of the present invention may be implemented in any combination of hardware and software.

The foregoing description of the example embodiments of the invention has been presented for the purposes of illustration and description. It is not intended to be exhaustive or to limit the invention to the precise form disclosed. Many modifications and variations are possible in light of the above teaching. It is intended that the scope of the invention not be limited with this detailed description, but rather the scope of the invention is defined by the claims appended hereto.

What is claimed is:

1. A method for allocating resources to a plurality of applications, comprising:
   determining, by a computer, available resources of a networked computing system, wherein the available resources comprise processing resources, networking resources, and storage resources;
   determining, by the computer, for each application, required resources of the application, wherein the required resources of each application specify a type of servers on which the application can be hosted, the type of servers being based on attributes of the servers including attributes relating to processor architecture and processing power, wherein the servers are part of the processing resources;
   determining, by the computer, an assigned subset of the available resources for each application as a function of the required resources of the application and the available resources, wherein determining the assigned subset of available resources for each application is based on a linearized objective function that reduces communication delays between resources of the subset of the available resources in conformance with bandwidth capacity requirements of the application and in conformance with network bandwidth limitations, wherein the linearized objective function includes a linear combination of variables; and
   associating the applications with the assigned subsets of resources.

2. The method of claim 1, wherein the networking resources comprise network switches.

3. The method of claim 1, wherein the storage resources comprise a storage area network, wherein the storage area network includes at least one pair of redundant core switches coupled to storage devices, the core switches coupled to the processing resources via a plurality of edge switches.

4. The method of claim 1, wherein determining the assigned subset of available resources for each application is performed by solving a mixed-integer programming problem.

5. The method of claim 4, wherein the available resources include network switches, and the mixed-integer programming problem reduces communication delays between resources of each subset of the available resources by reducing data traffic on network links that interconnect the network switches.

6. The method of claim 1, wherein the attributes relating to processor architecture and processing power specify processor type and processor speed.

7. The method of claim 6, wherein the resource requirements further specify storage patterns of files for each application, wherein determining the assigned subset is based on the resource requirements that further specify storage patterns of files.

8. The method of claim 1, wherein the network bandwidth limitations are expressed as linear constraints, and wherein determining the assigned subset of the available resources for each application is a linear optimization problem.

9. The method of claim 8, wherein determining the assigned subset of the available resources for each application is a mixed integer programming problem.

10. The method of claim 1, wherein determining the assigned subset of the available resources for each application is based on the linearized objective function to reduce a number of hops between processing resources in the assigned subset.

11. The method of claim 1, wherein the linearized objective function is provided by substituting products of binary variables in a non-linear objective function with replacement binary variables in the linearized objective function.

12. A system comprising:
   a computer having a processor and configured to:
      determine available resources of a networked computing system, wherein the available resources comprise servers, networking resources, and storage resources;
      determine required resources for each application of a plurality of applications, wherein the required resources for each application specify a type of the servers on which the application can be hosted, the type of servers being based on attributes relating to processing architecture and processing power;
      determine an assigned subset of the available resources for each application as a function of the required resources of the application and the available resources, wherein determining the assigned subset of available resources for each application is based on a linearized objective function that reduces communication delays between resources of the subset of the available resources in conformance with bandwidth capacity requirements of the application and in conformance with network bandwidth limitations, wherein the linearized objective function includes a linear combination of variables; and
      associate the applications with the assigned subsets of resources.

13. A system, comprising:
   a plurality of network-coupled processing resources;
   a plurality of storage resources network-coupled to the processing resources, wherein the processing and storage resources are allocated to a plurality of applications;
   a computing arrangement configured to:
      determine, for each application of the plurality of applications, required resources of the application, wherein the required resources of each application specify a type of servers on which the application can be hosted, the type of servers being based on attributes of the servers including attributes relating to processor architecture and processing power, wherein the servers are part of the processing resources;
      determine an assigned subset of the processing and storage resources for each application as a function of the required resources of the application and the processing and storage resources, wherein determining the assigned subset of processing and storage resources for each application is based on a linearized objective function that reduces communication delays between resources of the subset of the processing and storage resources in conformance with bandwidth capacity requirements of the application and in conformance with network bandwidth limitations, wherein the linearized objective function includes a linear combination of variables; and associate the applications with the assigned subsets of processing and storage resources.

14. The system of claim 13, wherein the storage resources comprise a storage area network, wherein the storage area network includes at least one pair of redundant core switches coupled to storage devices, the core switches coupled to the network via a plurality of edge switches.

15. The system of claim 14, wherein the computing arrangement is configured to determine each assigned subset by solving a mixed-integer programming problem.

16. The system of claim 15, wherein the processing resources are coupled by network switches, and the mixed-integer programming problem reduces communication delays between resources by reducing data traffic on network links that interconnect the network switches.

17. A non-transitory computer-readable medium configured with instructions for causing a processor of a computer to allocate resources to a plurality of applications, comprising:

determining available resources of a networked computing system, wherein the available resources comprise processing resources, networking resources, and storage resources;

determining, for each application, required resources of the application;

determining an assigned subset of the available resources for each application as a function of the required resources of the application and the available resources, wherein determining the assigned subset of available resources for each application is based on a linearized objective function that reduces communication delays between resources of the subset of the available resources in conformance with bandwidth capacity requirements of the application and in conformance with network bandwidth limitations, wherein the linearized objective function includes a linear combination of variables; and associating the applications with the assigned subsets of resources, wherein the required resources of each application is specified in resource requirements that include attributes of the processing resources, wherein the attributes specify processor type and processor speed.

18. The non-transitory computer-readable medium of claim 17, wherein the resource requirements further specify storage patterns of files for each application, wherein determining the assigned subset is based on the resource requirements that further specify storage patterns of files.

19. The non-transitory computer-readable media of claim 17, wherein the network bandwidth limitations are expressed as linear constraints, and wherein determining the assigned subset of the available resources for each application is a linear optimization problem.

20. The non-transitory computer-readable media of claim 19, wherein determining the assigned subset of the available resources for each application is a mixed integer programming problem.

21. The non-transitory computer-readable media of claim 17, wherein determining the assigned subset of the available resources for each application is based on the linearized objective function to reduce a number of hops between processing resources in the assigned subset.

22. The non-transitory computer-readable media of claim 17, wherein the linearized objective function is provided by substituting products of binary variables in a non-linear objective function with replacement binary variables in the linearized objective function.

23. The non-transitory computer-readable medium of claim 17, wherein the processing resources comprise servers each having at least one processor.

24. The non-transitory computer-readable medium of claim 17, wherein the networking resources comprise network switches.

25. The non-transitory computer-readable medium of claim 17, wherein the storage resources comprise a storage area network, wherein the storage area network includes at least one pair of redundant core switches coupled to storage devices, the core switches coupled to the processing resources via a plurality of edge switches.

26. The non-transitory computer-readable medium of claim 25, wherein reducing the communication delays between resources comprises solving a mixed-integer programming problem.

27. The non-transitory computer-readable medium of claim 26, wherein the available resources include network switches coupled with the processing resources, and the mixed-integer programming problem reduces communication delays between resources of each subset of the available resources by reducing data traffic on network links that interconnect the network switches.

* * * * *